United States Patent [19]
Barker

[11] Patent Number: 5,121,739
[45] Date of Patent: * Jun. 16, 1992

[54] PORTABLE HEAT DISPENSING UNIT

[76] Inventor: Stanley G. Barker, 607 Madison St., Joliet, Ill. 60435

[*] Notice: The portion of the term of this patent subsequent to Aug. 29, 2006 has been disclaimed.

[21] Appl. No.: 556,123

[22] Filed: Jul. 23, 1990

[51] Int. Cl.$^5$ .......................... F24C 1/00; F02N 17/02; B60H 1/02
[52] U.S. Cl. ................................. 126/248; 126/208; 237/12.3 C; 123/142.5 R; 432/63
[58] Field of Search .................. 126/208, 248, 204, 4; 237/12.3 A, 12.3 R, 12.3 C; 123/142.5 R; 432/62, 63

[56] References Cited

U.S. PATENT DOCUMENTS

| | | | |
|---|---|---|---|
| 1,862,114 | 6/1932 | Gilly | 126/93 |
| 2,295,177 | 9/1942 | King | 263/19 |
| 2,410,353 | 10/1946 | McCollum | 237/12.3 C |
| 2,412,088 | 12/1946 | Holthouse | 237/12.3 C X |
| 2,418,097 | 3/1947 | Ruff | 263/19 |
| 3,304,004 | 2/1967 | Hirabowerckyj | 237/12.3 C X |
| 3,451,663 | 6/1969 | Hille | 263/19 |
| 3,916,870 | 11/1975 | Beavers | 126/110 |
| 4,268,248 | 5/1981 | Wilbur | 432/62 |
| 4,860,726 | 8/1989 | Barker | 126/208 |

Primary Examiner—Larry Jones
Attorney, Agent, or Firm—Wood, Phillips, Van Santen, Hoffman & Ertel

[57] ABSTRACT

A portable heat dispensing unit is provided with retractable ducts, and an internal heat chamber, having suitable in line apertures in the heater container vessel and heat chamber to accept a source of heat from from inserted burners. The heat is then fan blown through a retractable duct fastened to the heat chamber which can be directed to deliver the heat where desired. Other accessory components are: A thermometer to monitor the heat intensity: A second retractable duct surrounding the heat duct to insulate it from cold winds, and also for use as a return air duct when heat is applied to an enclosed space such as a tent or room. An opening is provided into the container vessel between the two ducts to allow the return air to be recirculated by a fan which moves the air through the heat chamber. The burner insertion holes in the container vessel also act as auxiliary air openings providing make up air access for burner requirements. A support tube which is mounted on the container vessel provides a mounting means for dowel extensions to support the heat duct when extended so it can be used as a warming station. Ducts can be retracted and secured at the container vessel. The container vessel also has internal space that is accessible to store the components of the heater and a handle to carry it. The assembly makes a compact heating unit that can be powered by a rechargeable battery to operate the fan, making it completely self powered and portable.

18 Claims, 3 Drawing Sheets

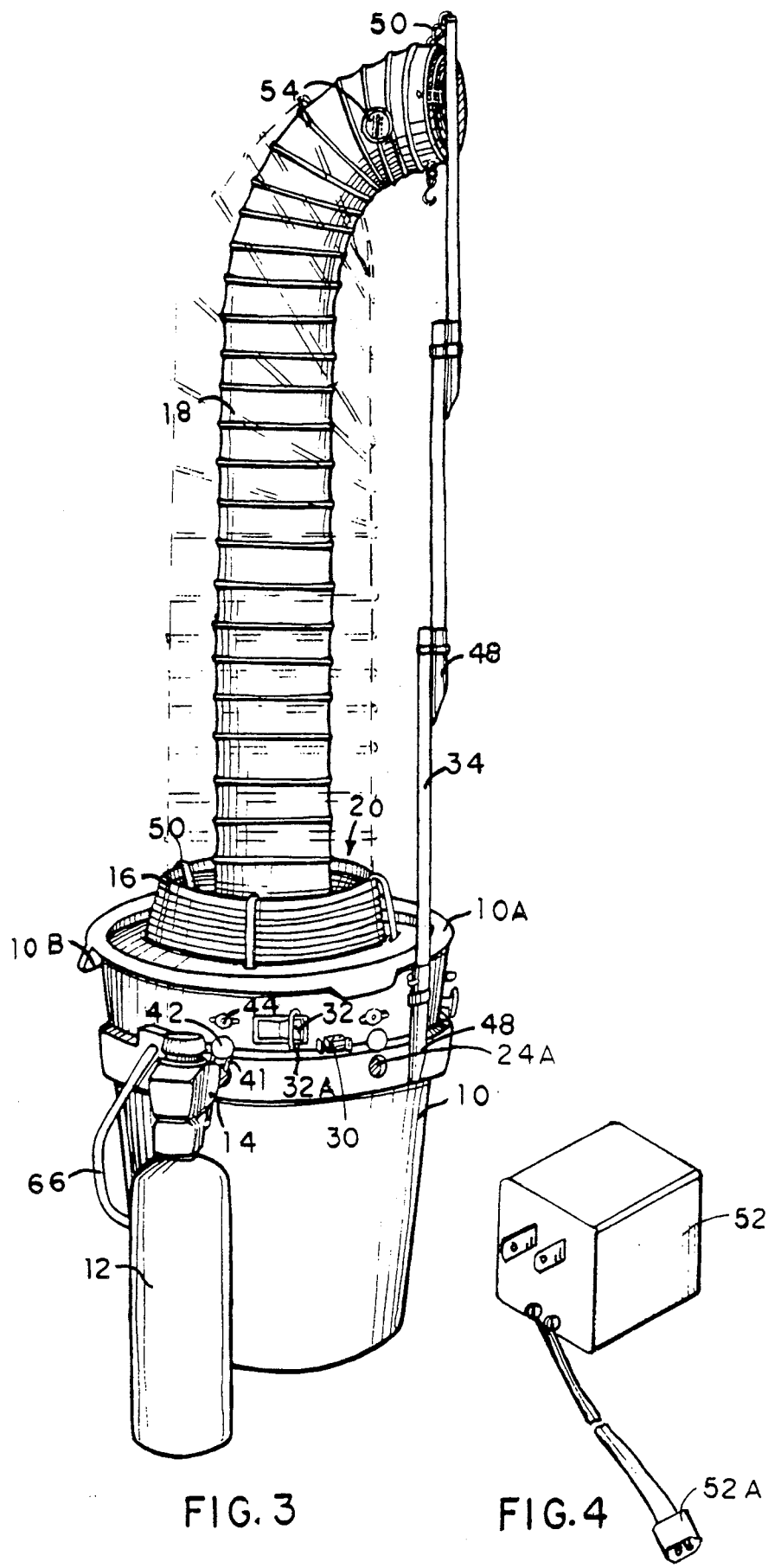

PORTABLE HEAT DISPENSING UNIT

BACKGROUND

1. Field of Invention

This invention relates to portable heaters, generally for remote use, primarily small aircraft engine preheating and utility applications, such as heating tents, small rooms, or personnel.

2. Description of Prior Art

Heretofore aircraft preheaters and other portable heaters have certain shortcomings in safety, and convenience. Present flame type heaters consume oxygen from inside the tent or room air. This air is also inhaled by the occupants and therefore air must be carefully monitored to be sure there is adequate ventilation, otherwise dangerous carbon monoxide will form when the flame lacks oxygen. Present flame type heaters must be cautiously avoided to prevent burns, and take up excessive space due to the clearance that must be provided to them.

OBJECTS AND ADVANTAGES

Accordingly several objects and advantages of my invention are: To make a safe heater for tents or personal heat applications. A heater that is an economical compact portable light weight preheater for aircraft engines. A heater hich is easy to use and store and be of use with or without an electric power supply. In the realm of safety, the object is to have a heater that does not take up space inside of the tent or room to be heated. A heater whose casing remains cool so accidental contact can not cause burns. Also the object is to take primary combustion air from the outside air rather than from the room air. This helps prevent the possibility of dangerous carbon monoxide formation. Oxygen depletion can occur when flame type heaters are operated inside without adequate ventilation.

DRAWING FIGURES

In the drawings closely related figures have the same number but different alphabetic suffixes.

FIG. 3 is a perspective view of the heater set up as a warming station to disperse heat, the heat duct being supported with dowels.

FIG. 4 is a perspective view of the battery charger.

REFERENCE NUMBERS IN DRAWINGS

10—CONTAINER VESSEL
10A—CONTAINER VESSEL LID
10B—CONTAINER VESSEL LID GRIP
12—L.P. GAS CYLINDER
14—BURNER ASSEMBLY
16—RETURN AIR DUCT
18—HEAT DUCT
20—AIR OPENING
22—HEAT CHAMBER
24—BURNER OPENING IN HEAT CHAMBER
24A—BURNER OPENING IN CONTAINER VESSEL
26—FAN
28—BATTERY
30—CHARGING RECEPTACLE
32—FAN SWITCH
32A—FAN SWITCH SAFETY LOCK PIN
34—DOWEL ROD
38—BATTERY STRAP
41—BURNER GRIP RING
42—BURNER RETAINING POST
44—RETAINER POST LOCK
46—HEAT CHAMBER SUPPORTS
48—DOWEL SUPPORT TUBE
50—TIE DOWN
52—CHARGER
52A—CHARGER CONNECTING PLUG
54—THERMOMETER
56—AIRCRAFT
56A—AIRCRAFT ENGINE AIR INTAKE
62—CONNECTING WIRES
64—BURNER PRIMARY AIR OPENING
66—HANDLE
68—DUCT GUARD

DESCRIPTION

FIGS. 1 TO 4

Figure 1:
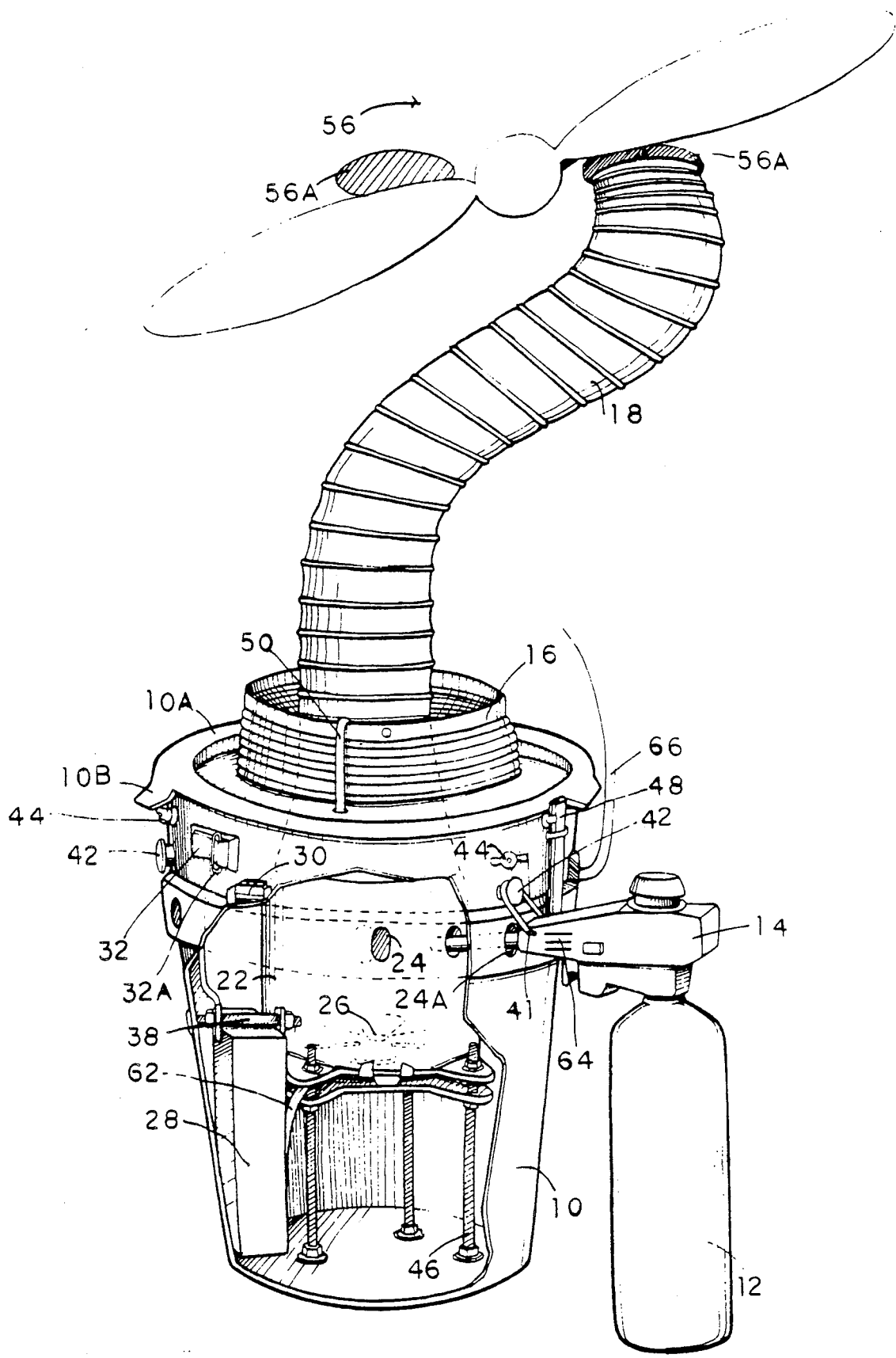
FIG. 1 shows a perspective view of the heater as it is used to heat an aircraft engine, with a cutaway of the container vessel showing the internal components.
Figure 2:
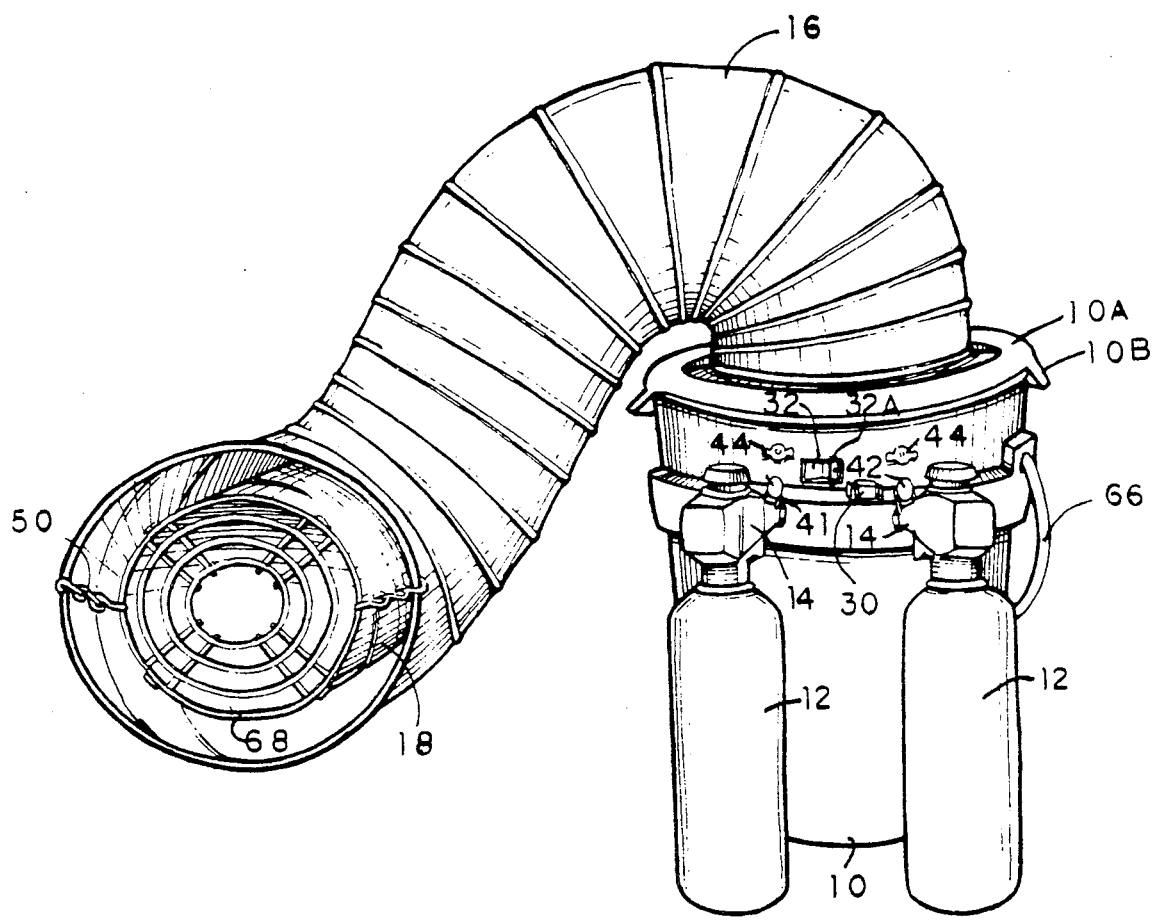
FIG. 2 is a perspective view of the heater positioned to heat a tent or room area.

FIG. 1 shows an overall view of the heater, a container vessel 10 is the basic structure to store and position components, burners 14 with attached fuel cylinders 12, have their burner tubes positioned through openings 24A in the shell of the container vessel 10, and then through in line openings 24 in the internal heat chamber 22, retained in place by a burner grip ring 41, which is latched onto burner retaining post 42, and locked in place by retainer post rotatable lock 44, thereby positioning the burner so flames will burn inside the internal heat chamber 22. The heat chamber 22 is supported in the container vessel 10 by support rods 46 for proper air circulation clearance. A blower fan 26 is located in the bottom of the heat chamber 22 operated by the battery 28, through switch 32, and a heat duct 18 attached to the top of said heat chamber 22. The heat duct 18 can be extended or retracted, and can be fastened for storage on the container vessel lid 10A, with tie downs 50. Lid 10A is held in place with container vessel lid grips 10B. A return air duct 16 can be extended along with the heat duct 18 as shown in FIG. 2, it can also be retracted for storage on the container vessel lid 10A, with tie downs 50. An air opening 20 is provided into the container vessel 10 between the ducts 16 and 18. A thermometer 54 is positioned in the heat duct 18. A charging receptacle 30 is mounted on the container vessel 10 wired 62 to the battery 28. The connector plug 52A for the charging receptacle 30 is wired to charger 52. Burner primary air enters burner at 64. FIG. 4. A dowel holder tube 48 is located on the side of the container vessel 10. A carry handle 66 also attaches to the container vessel 10 as shown in FIG. 3. A duct guard 68 is located on the end of duct 18.

OPERATION OF INVENTION

FIGS 1 TO 4

Operating components (BURNERS 14, FUEL CYLINDERS 12, DOWEL EXTENSIONS 34, AND CHARGER 52) can be stored in the container vessel 10 for portability, removing the container vessel lid 10A by freeing the catches 10B gives access to the components for assembly, the lid 10A is reinstalled when the components are removed from the container vessel 10. Burners 14 are installed with burner tubes positioned through access holes 24 and 24A, so the burn is contained in the heat chamber 22, the burners 14 are locked in place on the retaining posts 42 with the rotatable locks 44. The retractable ducts 16 and 18 are extended by freeing the tie downs 50, this allows positioning of the ducts 16 and 18 to manipulate the air as desired. To start the heater, the fan 26 is turned on with switch 32 after removing the safety lock pin 32. The rechargeable battery 28 supplies power for the fan 26. When the fan 26 is operating the burners 14 are trigger started and locked on. The fan 26 blows the heat from the burners 14 through the duct 18, and calibration of the burners 14 output is monitored with the aid of the thermometer 54 in the heat duct 18. The return air duct 16 channels the return air to the container vessel 10 through the opening 20 between the ducts 16 and 18 and thereby feeds fan 26 intake for circulation. When the duct ends 16 and 18 are positioned in an enclosure such as a tent or room the heated air is fed into the area through heat duct 18 and out of the area through return duct 16 into the container vessel 10 where it passes through the heat chamber 22, is reheated and recirculated, thus increasing the efficiency of the heater by requiring less heat to maintain temperature. Access holes 24A are utilized as auxillary air openings and are sized to allow enough oxygen infiltration to supply combustion air requirements to prevent oxygen depletion of circulated air. Another application of the heater is accomplished by installing an elongated article of support, such as a dowel rod 34 into the dowel holder tube 48, to support the heat duct 18 on the dowel 34 with tie down 50 to establish a warming station where personel can get warmth when participating in outdoor activity. For aircraft engine preheating the return air duct 16 acts as an insulating cover to prevent cold winds from drawing heat from the heat duct 18 as heated air is guided to aircraft 56 air intake 56A. Battery 28 held by battery strap 38, is recharged as required with charger 52 plugged into a standard wall receptacle.

SUMMARY, RAMIFICATIONS, AND SCOPE

Accordingly the reader will see the heater has many applications possible due to its versatility as a result of its compactness for transport, its lightweight portability and its self contained power supply, thus providing quick heat within its scope for any application no matter how remote wherever flame safe air is prevelant.

Although the description above contains many specificities, these should not be construed as limiting the scope of the invention but as merely providing illustrations of the presently preferred embodiments of this invention. For example the heater could be constructed with automatic temperature control and of other shapes and sizes.

Thus the scope of the invention should be determined by the appended claims and their legal equivalents, rather than the examples given.

I claim:

1. A portable heat dispensing unit for heating applications comprising:
   a container vessel of a portable size that can be carried by a human being, said container vessel enclosing a heat chamber;
   aligned apertures in said vessel and said heat chamber;
   at least one burner having a burner tube sufficiently long to insert through said aligned apertures in the vessel into said heat chamber so as to provide a means of combustion therein, said burner having a triggered start to permit ignition after insertion;
   means for retaining the burner in a firing position;
   said heat chamber defining a chimney air passageway;
   fan means located in the chimney air passageway to assist a chimney effect as the heated air rises from the heat chamber;
   a power source means to operate said fan means;
   a heat duct connected to said chimney air passageway to guide the heated air; and
   an air opening in the container vessel to allow replenishment of air to the heat chamber.

2. The portable heat dispensing unit of claim 1 whereas said heat duct is flexible.

3. The portable heat dispensing unit of claim 1 whereas said heat duct is retractable.

4. The portable heat dispensing unit of claim 1 also having a thermometer in said heat duct to monitor the temperature.

5. The portable heat dispensing unit of claim 1 also having a return air duct to said container vessel to guide return air or replenishment air that was vented from said heat chamber.

6. The portable heat dispensing unit of claim 1 whereas said return air duct is flexible.

7. The portable heat dispensing unit of claim 1 whereas said return air duct is retractable.

8. The portable heat dispensing unit of claim 1 whereas said container vessel is also provided with a holder means for mounting an elongated support member to hold up said heat duct.

9. The portable heat dispensing unit of claim 1 whereas said container vessel also has a carry handle, whereby portability is simplified.

10. The portable heat dispensing unit of claim 1 whereas the heat duct and the return air duct are one within the other.

11. A portable heater comprising:
    an upright vessel of sufficiently small size as to be readily transported by the hand of a user and having an upwardly directed chimney-like combustion chamber;
    the lower end of said chimney-like combustion chamber having an air admitting opening;
    an electrical, battery operated fan mounted in said vessel and having a rotary fan blade located in said opening;
    means in said vessel for securing an electrical battery therein;
    a burner located in said chimney-like combustion chamber above said fan including conduit means extending through said chimney-like combustion chamber to the exterior of said vessel for connection to a bottled fuel cylinder; and
    an air inlet to said vessel and in fluid communication with said chimney-like combustion chamber at said lower end.

12. The portable heater of claim 11 wherein said conduit means comprise a burner tube positioned through aligned openings in said vessel and said combustion chamber; and means on said vessel for releasably locking said burner to said vessel.

13. The portable heater of claim 12 wherein said burner includes a ring and said means ofr releasably locking includes a post on said vessel for receiving said ring and a lock movable relative to said post to capture said ring.

14. The portable heater of claim 11 further including a flexible heat duct having one end mounted to said chimney-like combustion chamber at the upper end thereof; said air inlet being generally concentric to said upper end.

15. The portable heater of claim 14 including an additional duct disposed about said heat duct and in fluid communication with said air inlet.

16. The portable heater of claim 14 further including a generally vertically directed support tube mounted on the exterior of said vessel and a multiple section dowel extending upwardly from said tube and supporting said heat duct at a location remote from said one end thereof.

17. The portable heater of claim 11 further including a bale-like handle mounted on said vessel.

18. The portable heater of claim 11 wherein said vessel is a container vessel sized to store said burner and a bottled fuel container and other components of the heater.

* * * * *